United States Patent [19]

Ottesen

[11] 3,882,540

[45] May 6, 1975

[54] READBACK CIRCUITS FOR DIGITAL SIGNAL RECORDERS

[75] Inventor: Hjalmar H. Ottesen, Boulder, Colo.

[73] Assignee: International Business Machines Corporation, Armonk, N.Y.

[22] Filed: June 17, 1974

[21] Appl. No.: 480,072

[52] U.S. Cl. .................................................. 360/39
[51] Int. Cl. ............................................ G11b 5/09
[58] Field of Search ............ 360/39, 40, 41, 42, 43, 360/44, 45, 46

[56] References Cited

UNITED STATES PATENTS 3,623,040 11/1971 Erikson ................................ 360/43
3,821,716 6/1974 Ghajar ................................ 360/40

*Primary Examiner*—Vincent P. Canney
*Attorney, Agent, or Firm*—Herbert F. Somermeyer

[57] ABSTRACT

Digital signal processing techniques enhance readback of digital signals from a magnetic recorder. Sampled signal amplitudes obtained at bit period boundaries and midpoints are converted to digital signal sets, which sets are processed for equalization, DC restoration, phase error detection, generation of timing signals, and amplitude compensation of the sampled signal amplitudes.

10 Claims, 13 Drawing Figures

READBACK CIRCUITS FOR DIGITAL SIGNAL RECORDERS

BACKGROUND OF THE INVENTION

The present invention relates to magnetic digital signal recorders, particularly to those recorders employing digital signal processing techniques for handling signals recovered from a magnetic medium.

With the advent of large-scale integration (LSI), charge-coupled devices, as described in "ChargeCoupled Devices," by Gilbert F. Amelio, SCIENTIFIC AMERICAN, February 1974, Volume 230, Number 2, Pages 22–31, and the advances in digital signal processing could be examined for readback systems of digital magnetic recorders. Examples of digital signal processing circuits are found in the book entitled DIGITAL SIGNAL PROCESSING, edited by Lawrence R. Rabiner and Charles M. Rader, published by the Institute of Electrical and Electronic Engineers, New York, 1972, Library of Congress, Card No. 72-90358. Of particular interest is the article, "An Approach to the Implementation of Digital Filters," Jackson et al., Pages 210 et seq, which show the direct, cascade, and parallel filter forms employing parallel processing with 2's complement arithmetic. Such digital filters and related digital signal processing circuits employ a high-frequency clock for timing such circuits to be synchronous with respect to the signals being processed. Also of interest with regard to digital signal processing of periodic signals is the article by Francis D. Natali, "All-Digital Coherent Demodulator Techniques," in the PROCEEDINGS OF THE INTERNATIONAL TELEMETERING CONFERENCE, Los Angeles, California, Volume VIII, 1972, Pages 89–107, wherein a periodic signal is processed using synchronous sample times at the zero crossing and at the midpoint of the bit period. Phase locking algorithms control the synchronous sampler which converts the sampled signal amplitude to a set of digital signals. Data is detected from such set of signals by combining a data detection algorithm with a bit-synchronizing algorithm. The bit-synchronizing algorithm employs an in-phase and a mid-phase integrator for driving the data detection algorithm.

Because of the variation in portions in a readback signal from a digital signal magnetic recorder, the above-described techniques do not necessarily optimize processing and detection of data from such readback signals.

SUMMARY OF THE INVENTION

It is an object of the present invention to provide an enhanced readback circuit for a digital signal magnetic recorder employing digital signal processing techniques.

In accordance with the invention, a readback circuit for a digital signal magnetic recorder for processing a readback signal having periodic bit periods includes a sample and hold means for receiving readback signals and holding sampled signal amplitudes at least at the bit period boundaries. A digital-to-analog converter (DAC) receives the held sampled-signal amplitudes to generate a first set of digital signals representative of such held samples. A gated DAC register receives such first set of digital signals under control of later-described timing means. At least one digital signal processing circuit receives the first set of digital signals and operates on same to generate a second set of digital signals based upon the first set in accordance with a given transfer function or algorithm. A timing means is responsive to the second set of digital signals to adjust its operation for supplying timing signals in accordance with the bit periods of the readback signal. Such timing signals actuate the sample and hold means to receive the readback signal at least at the bit period boundaries and at the midpoint of the bit periods. The gated DAC register receives the first set of signals each time a sample has been taken and further actuates the digital signal processing circuits in synchronism with the bit periods. Further, a digital-to-analog converter is responsive to the second set of digital signals to supply a bias signal related to the magnitude represented by the second set of digital signals to said sample and hold means for adjusting the sampled signal amplitude in accordance therewith to provide automatic gain control in the readback system.

In accordance with a more specific aspect of the invention, the digital signal processing circuit includes a digital signal equalizing processing circuit having a register output. The register output supplies an intermediate set of digital signals to a digital DC restoring circuit, which generates the second set of digital signals. A digital filter receives the absolute magnitude of the second set of signals for adjusting the digital signal equalizer operation in accordance with the magnitude represented by the second set of digital signals. This rectified or magnitude indicating signal also drives the aforementioned digital-to-analog converter for adjusting the sample and hold circuit operation. It is preferred that the output of the digital-to-analog converter is filtered by a low-pass filter.

The timing means includes a phase error detecting circuit of the digital signal type. The output of this circuit indicates the transitions in the readback circuit, i.e., zero axis crossings. Such transitions actuate a circuit for ensuring that the second set of digital signals supplied to the equalizer and to the sample and hold digital-to-analog converter always has the same sign, i.e., performs a rectifying function.

The foregoing and other objects, features, and advantages of the invention will become apparent from the following more particular description of the preferred embodiment, as illustrated in the accompanying drawing.

THE DRAWING

DETAILED DESCRIPTION

Figure 1:
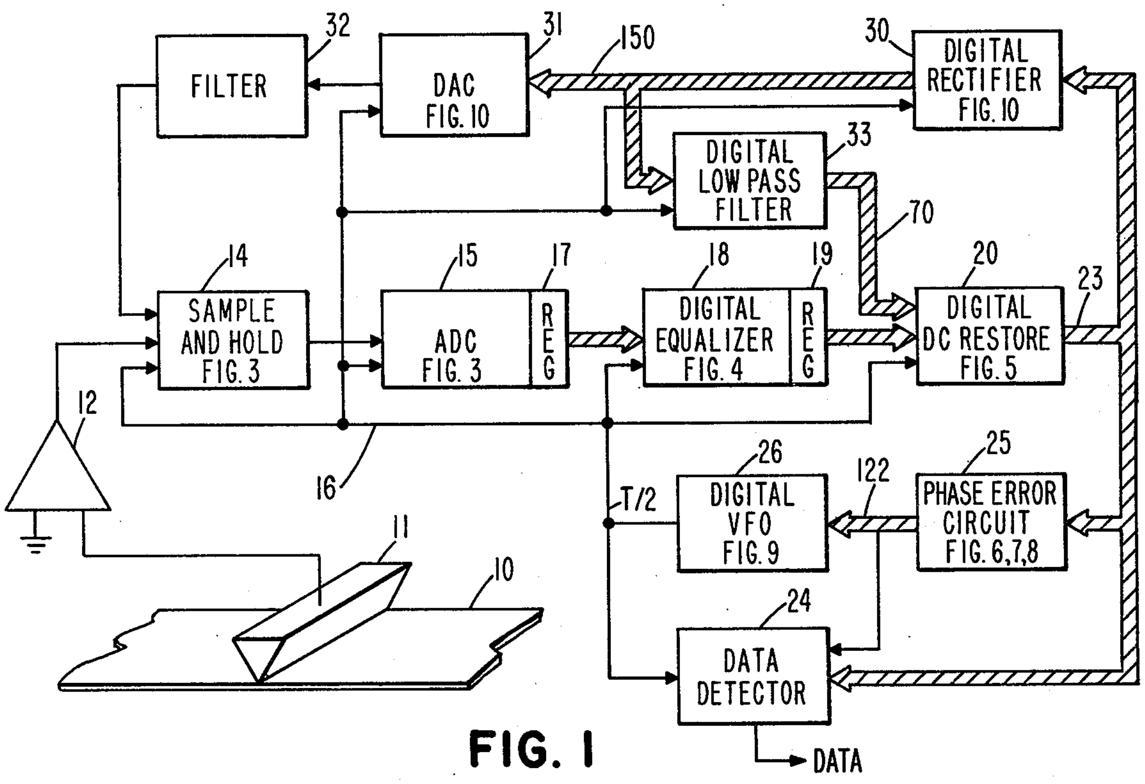
FIG. 1 is a block signal flow diagram of apparatus employing the present invention.

Referring now more particularly to FIG. 1, signals recorded on magnetic medium 10 are sensed by a read head or transducer 11 and supplied through a preamplifier 12 to a set of digital signal processing circuits incorporating the teachings of the present invention. Firstly, sample and hold circuit 14 receives a periodic readback signal and samples same as the zero-axis crossing and at the midpoint between zero-axis crossings, as shown in the timing diagram of FIG. 2. These sample and held signal amplitudes drive analog-to-digital converter (ADC) 15 whereat the signal amplitudes are quantized into a set of four digital signals. This set of four digital signals transfers in parallel into a holding register 17 under control of a timing signal received over line 16. The output of the holding register 17 drives digital signal processing circuit 18 which equalizes the digital signals in accordance with a predetermined algorithm, as will be later described. The output set of digital signals from digital signal equalizer 18 is in register 19. Register 19 supplies its set of four digital signals to DC restore circuit 20 which also employs digital signal processing techniques. DC restore circuit 20 supplies a second set of four digital signals over cable 23 to data detector 24 for synchronous detection of data, as well as to phase error detector circuit 25, as later described. Phase error circuit 25 supplies phase error indicating signals to digital VFO 26, shown in FIG. 9. VFO 26 supplies timing signals over line 16 which have a transition at each half period of the bit period for timing the sample and hold circuit 14, ADC 15, gating signals into register 17, plus synchronously operating equalizer circuit 18 and DC restore circuit 20.

From the above description, it is seen that the digital signal processing circuits employed in connection with this invention provide equalization and DC restoration functions for ensuring that data detector 24 is insulated from perturbations in the readback signal supplied by preamplifier 12. It is also desired to provide some automatic gain control to the digital signal processing circuits. Accordingly, the second set of digital signals on cable 23 is supplied through a rectifier 30. Rectifier 30 receives transition indicating signals from phase error circuit 25. To reverse the polarity of the second set of digital signals by complementing same in the 2's complement notation to supply absolute magnitude signals as output signals, such absolute magnitude output signals are supplied to DAC or digital-to-analog converter 31. DAC 31 is timed with the timing signals to supply analog outputs in a synchronous relationship to the sampled times of sample and hold circuit 14. Low-pass filter 32 passes the low-frequency components for adjusting the amplitude of the sampled readback signal for compensating for amplitude variations. Additionally, digital filter 33 receives the absolute magnitude signals for adjusting equalizer 18 operation, as will be later described.

Figure 2:
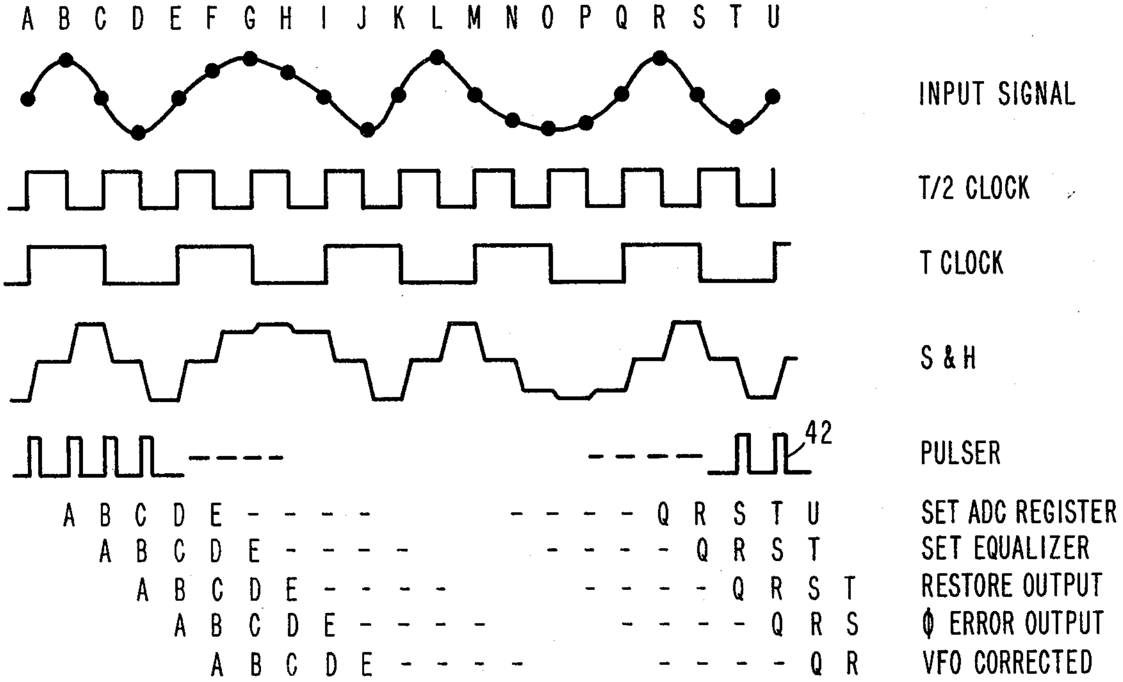
FIG. 2 is an idealized timing diagram showing operation of the FIG. 1 illustrated apparatus.

As best seen in FIG. 2, the time delay through the digital signal processing circuits for samples A-U, as represented by small circles on the input signal waveform, for VFO adjustment is about 2½ bit periods. By redesigning the digital VFO 26 to supply ¼ phase signals using the same timing signal generation techniques as described for FIG. 9, the time delay from a phase error occurring in the input signal to phase correction in the VFO can be reduced to less than two bit periods.

Figure 3:
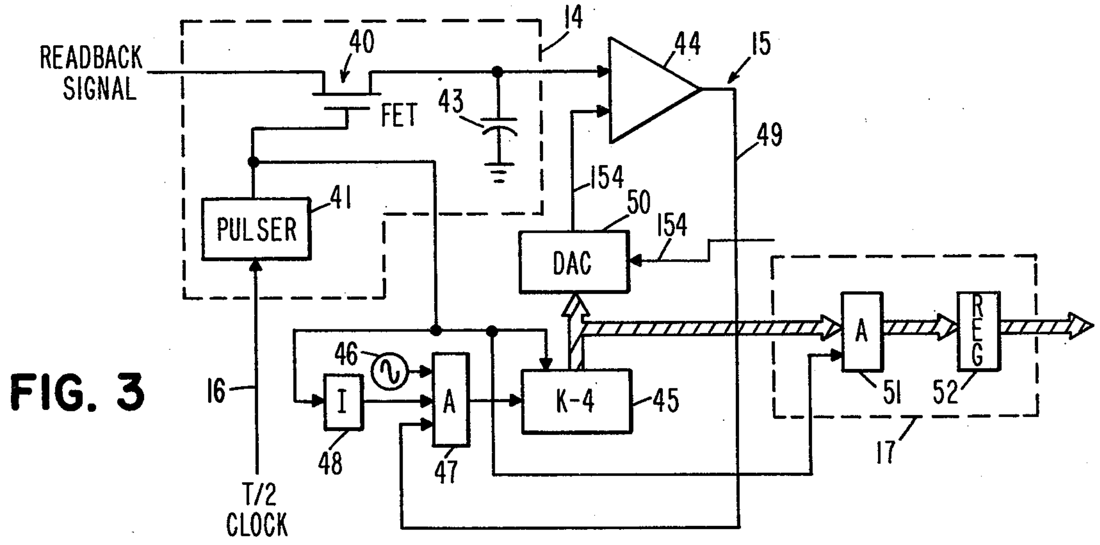
FIG. 3 is a combined circuit and block diagram of a timed sample and hold circuit, plus a quantizer of analog-to-digital converter circuit.

Sample and hold circuit 14 is shown in FIG. 3. The readback signal from preamplifier 12 is gated through FET (field effect transistor) 40 by pulser 41 in response to a transition of the T/2 clock shown in FIG. 2. The pulser output signals 42 open FET 40 for passing the readback signal amplitude a very short period of time. The passed readback signal amplitude is captured by capacitor 43 and held therein after FET 40 is made current nonconductive. Differential amplifier 44 has a high input impedance for maintaining the stored charge in capacitor 43 for at least ½ a bit period. In the illustration, analog-to-digital converter (ADC) 15 is intimately associated with the sample and hold circuit 14.

ADC 15 generates a digital value in four-stage counter 45 which is driven by a high-frequency oscillator 46 through AND circuit 47. AND 47 is enabled to pass oscillator 46 pulses whenever pulser 41 is not supplying a sampling pulse 42 to FET 40, as indicated by inverter circuit 48. Additionally, differential amplifier 44 supplying a not-null signal over line 49 completes AND circuit 47 enablement. Counter 45 counts at oscillator 46 rates until the output signal from DAC 50 substantially equals the stored signal amplitude of capacitor 43. At this time, amplifier 44 supplies a null signal disabling AND 47 and stopping the counting of counter 45. The numerical values stored in counter 45 now accurately represent, to a four-digit quantization, the signal amplitude stored in capacitor 43. This conversion takes a very short period of time as seen by the waveforms S and H of FIG. 2. Counter 45 maintains the count until the end of the sample time. AND's 51 pass the signal contents of four-stage counter 45 to register 52 in the gated DAC register 17. The output of register 42 constitutes a first set of four digital signals representative of the signal amplitude contained in capacitor 43. This is an absolute magnitude. The generation of the sign (polarity) is accomplished in circuit 25.

The design of the above-described sampling and quantization is selected based upon the signal-to-noise ratio of the readback signal supplied by preamplifier 12. The sampling rate is a function of the system bandwidth and spectrum aliasing that occurs in the sampling. Resolution of the first set of digital signals relates to the closeness of the quantized values to the actual amplitude stored in capacitor 43. As a result of selecting four bits in the first set of digital signals, there is a rounding; i.e., the signal is approximated to the nearest or finest quantizing level. Further, there is a truncation to four bits to approximate the readback signal by the greatest quantization level. When the signal exceeds such quantizing level, the quantization effectively hard limits the readback signal to that quantization level. To control such truncation, automatic gain control is applied to the quantization process. In the FIG. 1 illustration, such automatic gain control is applied directly to the sample and hold circuit, as will be later described. It is to be understood that such automatic gain control gain can be applied digitally to the output of the DAC at register 17. For example the ADC value represented by a set of digital signals can be masked, multiplied, added, subtracted, or otherwise combined with the first set of digital signals for effecting automatic gain control. In the illustrated embodiment, 16 levels of resolution, i.e., a four-bit bipolar ADC, was selected for a readback channel having a 17 DB signal-to-noise ratio to yield a channel-to-noise power of 30 times greater than the quantizing noise power.

In digital signal magnetic recorders, particularly at the higher recording densities, intersymbol interference (ISI) causes perturbations in the signal. Equalization can compensate for such interference. Such ISI is often referred to as "peak shift," "pulse crowding," etc. The equalization can be made adaptive to various signal parameters by sensing such parameters or using a priori knowledge of the characteristics of the readback channel, such as medium velocity with respect to the transducer, etc. Such parameters can be automatically set by computer analysis for making the apparatus adaptive based on such computer analysis.

For a readback channel having a 17 DB output signal-to-noise ratio and a data rate of about $10^6$ bits per second, sampling at two samples per bit period with a four-bit bipolar ADC, a digital signal equalizer in the Z domain was selected for digital signal equalization. In designing a digital signal equalizer based upon an analog circuit design, it is preferred that a bilinear transformation be employed. Such bilinear transformation tends to reduce aliasing. This is accomplished by a conformal mapping from the S domain to the Z domain. In effect, the bilinear Z transform makes continuous and discrete frequency transfer functions identical. The equation to be solved by the digital signal processing circuit 18 is:

$$Q\ (Z) = T_S/2 + K_{aa}(1 + Z/1 + B_{a1}Z) +$$
$$(K_{bb})\ (1 + Z)\ /\ (1 + B_{b1}Z) +$$
$$K_{cc}(1 + A_{c1}Z + A_{c2}Z^2)/(1 + B_{c1}Z + B_{c2}Z^2)$$

In the above equation, the $Z$ transform is defined in positive powers of $Z$. The $K$'s, $A$'s and $B$'s are constants; and $T_S$ is the sampling period. Typical values for multiplying constants for the above transform equation are set forth below in Table I:

TABLE I

| | Sampling Period $T_S$ | | |
|---|---|---|---|
| Constants | $10^{-6}$ Sec. | $5 \times 10^{-7}$ Sec. | $10^{-7}$ Sec. |
| ½ $T_S$ | $0.5 \times 10^{-6}$ | $0.25 \times 10^{-6}$ | $0.5 \times ^{10-7}$ |
| $K_{aa}$ | −0.0920 | −0.0454 | −0.0090 |
| $K_{bb}$ | 0.0084 | −0.0025 | −0.0112 |
| $K_{cc}$ | 2.0375 | 0.7914 | 1.5929 |
| $K_{cc} \times A_{c1}$ | 0.0741 | −0.3147 | −0.6299 |
| $K_{cc} \times A_{c2}$ | −1.9634 | −2.1061 | −2.2228 |
| $B_{a1}$ | −0.9969 | −0.9984 | −0.9997 |
| $B_{b1}$ | −0.7986 | −0.7986 | −0.7986 |
| $B_{c1}$ | −0.0642 | −0.0642 | −0.0642 |
| $B_{c2}$ | 0.6004 | 0.6004 | 0.6004 |

Figure 4:
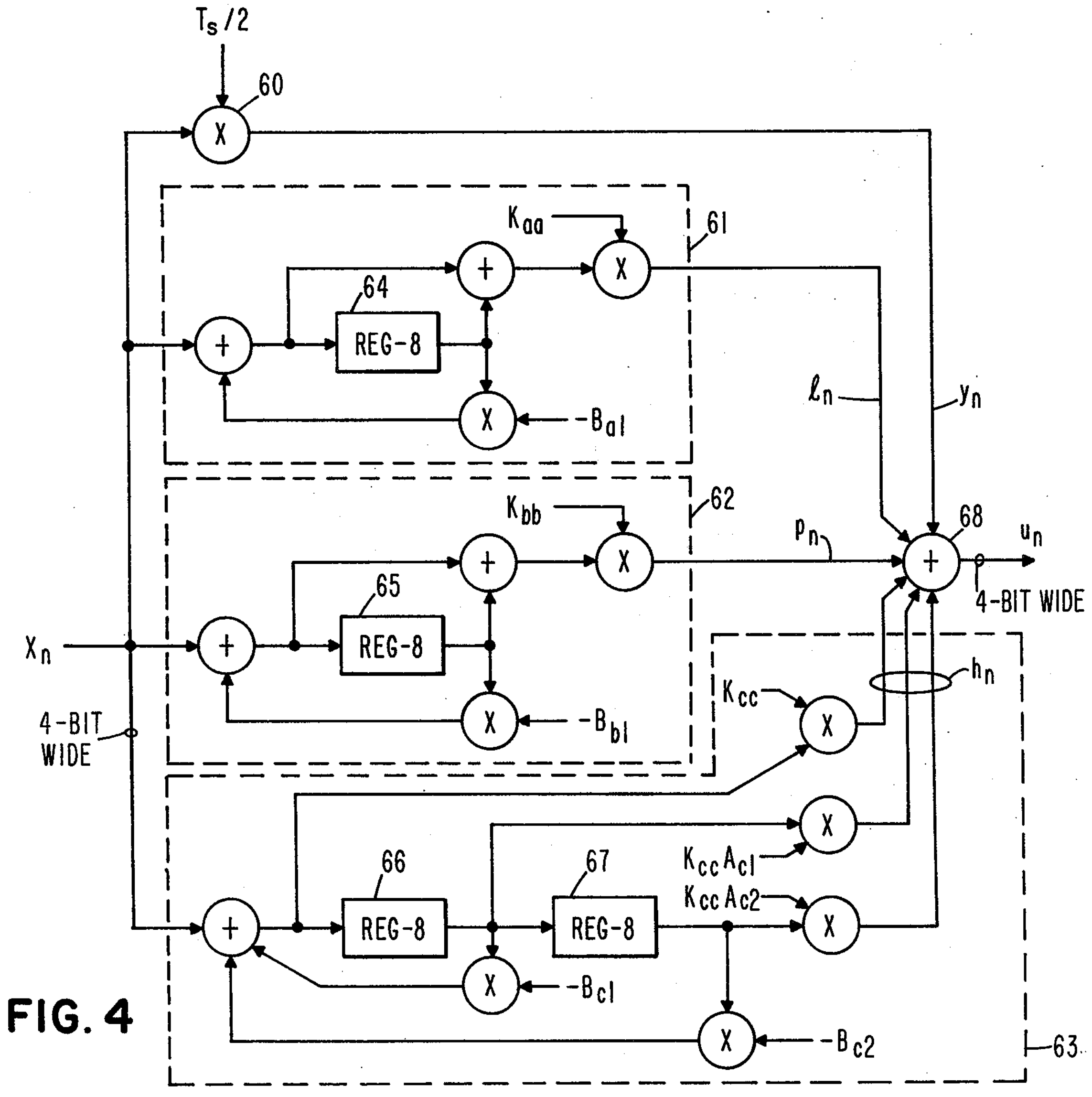
FIG. 4 is a block diagram of a digital signal processor circuit for equalizing a readback signal in a digital magnetic recorder.

The FIG. 4 illustrated implementation of the digital signal processing equalizer is in accordance with the referenced article from the IEEE Digital Signal Processing book, supra. The leftmost term of the equation is solved by multiplying elements 60, the second term by the elements 61, the third term by elements 62, and the last term by elements 63. Construction of these elements is in accordance with the teachings of the above-referenced article and will not be further explained for that reason. The symbols used in FIG. 4 are those employed in the referenced text book.

A greater degree of accuracy in the illustrated embodiment is required for the B's than for the K's and A's. This relates to the analog equivalent of poles and their location with respect to the unit circle in the Z domain or the right-half plane in the S domain. The above relationship provides a stable equalizing function. For this reason, eight-bit shift registers 64–67 are used in conjunction with the B terms, plus a total of nine 8 × 8 multiplications or 8 × 8 bit and 4 × 4 bit additions are used in the filter for generating the equalization function. The delays between the input to the output are shown in the above Table I. An 8 × 8 bit multiplication, plus storage requires approximately 100 nanoseconds; while addition takes 10 nanoseconds. Other functions also take 10 nanoseconds. By adding more multipliers and adders to the illustrated four circuits, processing time can be reduced. For example, two identical equalizers in parallel, each with three multipliers and an adder, such as adder 68, can cut the digital signal processing time in half, for example, from 350 nanoseconds to 175 nanoseconds. Also, by selecting the constants A, B, and K to have more 0's than 1's and employing look-ahead multipliers, equalization digital signal processing time can be further reduced.

The equalized digital signal set generated in accordance with the FIG. 4 illustrated apparatus may still not be suitable for use in successful data detection from a digital signal magnetic recorder. For example, some of the modulation codes employed with digital magnetic recording, such as NRZI, MFM, run-length limited NRZI, and others, may have a net DC component in the power spectrum over several bit periods. When such a signal having a DC component is processed through an analog readback channel, baseline shift occurs. The equivalent occurs in a digital signal processing circuit.

Figure 5:
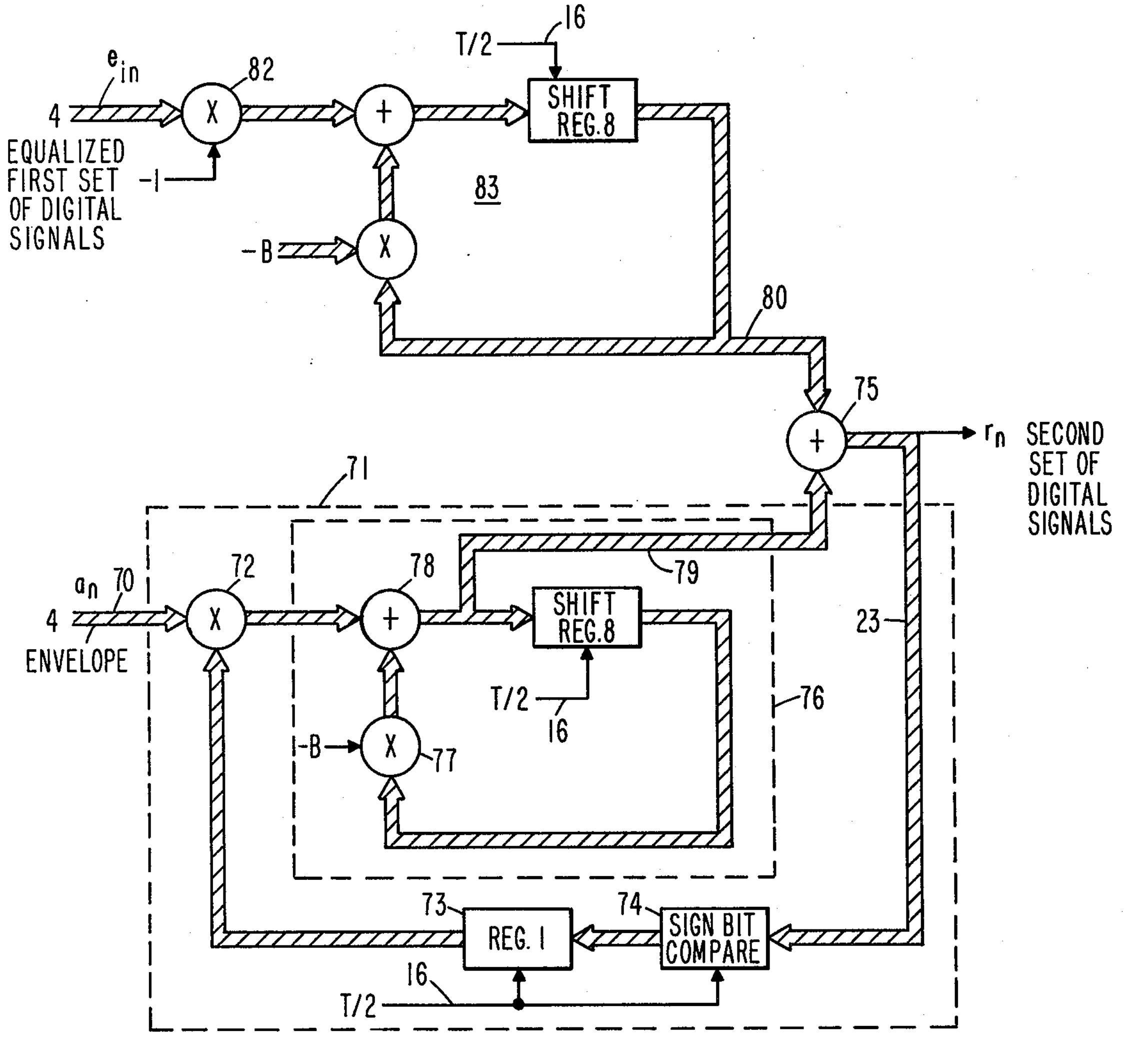
FIG. 5 shows a digital signal processing circuit yielding a DC restore function to digital signals being processed.

Such baseline shift results in a significant deterioration in quality of data signal detection. A DC restorer restores the baseline to its desired level by adding an equal, but opposite, signal to the shift. The digital signal processing DC restorer, shown in FIG. 5, was selected to be equivalent to the analog DC restorer taught by Ottesen and Quickstad in the May 1973 issue of the IBM TECHNICAL DISCLOSURE BULLETIN, Pages 3,779 and 3,780, Volume 15, Number 12. The digital signal processing version is based upon the impulse and variant transformation. The DC restorer was adaptive to the amplitude of the signal being restored in the same way the digital signal version is made adaptive to the amplitude of the signal via rectifier 30 and digital low-pass filter 33. The envelope indicating set of digital signals is transferred over cable 70 to adaptive slicer circuit 71. The sign of the envelope is inverted in the −1 multiplier 72 as controlled by the one-bit register 73. Sign bit compare 74, actuated by the T/2 clock from line 16, responds to the present DC restored signal on cable 23 with the previous sign (a transition has occurred) means that the sign of the −1 multiplier 72 must be reversed to effect a subtraction of the sliced envelope from the baseline in adder 75. Integrator 76 contains an eight-bit shift register which is shifted each T/2 clock period through —B multiplier 77 and is added with the input envelope compensation signal in adder 78. Adder 78 output signal on cable 79 represents the sliced DC to be subtracted from the baseline representation of the input signal. That is, the digital values represented by the signals on cable 79 are the compensation or baseline correcting signal to be subtracted from the magnitude or baseline shifted signal on cable 80. The input signal is −1 multiplied in multiplier 82; thence, through high-pass filter generally denoted by numeral 83 to generate the signal to be restored on cable 80. The output of adder 75 which subtracts the equalizing set of digital signals on cable 79 from the high-pass filtered signal on line 80 is the second set or DC restored signals on cable 23. The −1 multiplier 82 converts the first set of digital signals to the 2's complement. When the equalizer 18 output is in the 2's complement form, multipler 82 is dispensed with.

Figure 6A:
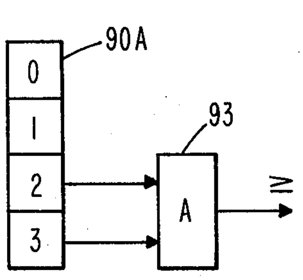
FIGS. 6A and 6B are block diagrams of threshold circuits usable with the FIG. 6 illustrated apparatus.
Figure 6B:
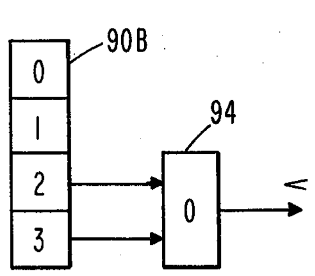
Figure 6:
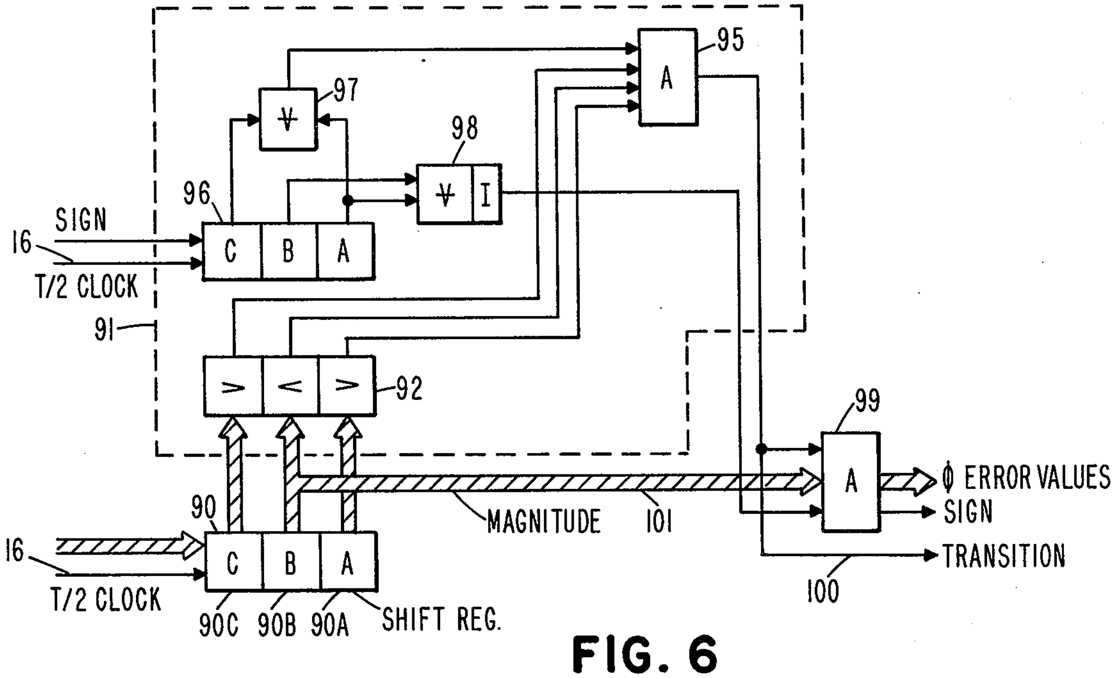
FIG. 6 shows a digital signal processing circuit for detecting transitions and phase errors.

A transition detector usable with the present invention is shown in FIG. 6, along with circuitry for supplying phase error or phase difference values at each detected transition. The four-bit digital value signals from DC restore circuit 20 over cable 23 are gated by the T/2 clock signal on line 16 to three-stage, four-bit wide, shift register 90. Each of the four bits in the respective stages A, B, and C are supplied to transition detector 91. A first set of threshold detectors 92 responds to the four-bit digital values to indicate that the number in A stage is greater than a predetermined threshold, in the B stage is less than a predetermined threshold and in the C stage greater than the first-mentioned predetermined threshold. The greater-than threshold detector is shown in FIG. 6A wherein the four-bit stage 0–3 register 90A has the most two significant digit positions 2 and 3 supplying binary 1 signals to AND circuit 93. If both stages 2 and 3 contain binary 1's, the number in stage 90A is greater than or equal to the decimal number 12. In a similar manner, in FIG. 2B the four-bit stage register 90B applies the 0-indicating signals from stages 2 and 3 to OR circuit 94 indicating that the number in stage 90B is less than decimal 12. The output signals from the threshold detectors 92 are supplied in parallel to AND circuit 95. These three signals from threshold detectors 92 indicate that a zero crossing may have occurred. AND 95 then supplies a transition indicating signal over line 100 as described below.

There may be a false zero crossing indication when stages 90A and 90C contain two peaks of a readback signal, while center stage 90B contains a number representing a signal perturbation within the readback signal rather than the true zero crossing. To ensure there is a true zero crossing, the sign of the digital values, i.e., one a 0 for + and −, respectively, as generated by A-to-D converter 15 and supplied through equalizer 18 is synchronously set into a three-stage single bit wide shift register 96. T/2 clock on line 16 shifts the sign bits through register 96 at the same time the corresponding four-bit magnitudes supplied over cable 23 are shifted through register 90. A sign change between the first received sign bit at stage 96A and the last of the three sign bits in 96C are detected by EXCLUSIVE OR circuit 97. That is, if 96A contains a 1 and 96C contains a 0, there has been a sign change resulting in an active output signal supplied to AND 95 from EXCLUSIVE OR 97, hence a valid transition has been detected.

To ensure that the transition is identified by the sign in 96B, such that the magnitude in stage 90B represents the phase error of the zero crossing, EXCLUSIVE OR and inverter circuit 98 samples the signal states of stages 96A and 96B to open output AND circuit 99. AND 99 passes the stored signal values of center stage 90B as received over cable 101 whenever EXCLUSIVE OR 98 is supplying an active signal simultaneously with AND 95 supplying its signal. There are several safeguards in indicating a phase error; i.e., there must be a change in sign at a predetermined location as indicated by the active output signals of EXCLUSIVE OR's 97 and 98, plus the digitized values of the readback signal must have changed a predetermined amount as determined by the settings of threshold detectors 92. Since the center stage 90B contains the quantized amplitude of the zero-axis crossing, any non-zero value in stage 90B represents phase error.

Figure 7:
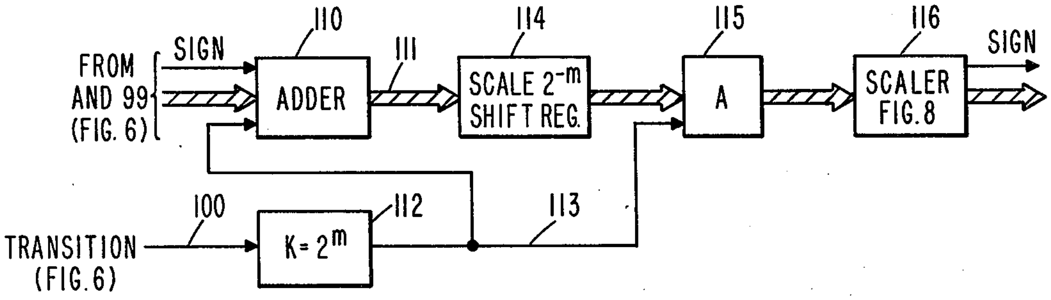
FIG. 7 is a block diagram of a digital signal processing circuit for controlling phase error gain in a phase-locked loop.

Referring to FIG. 7, a phase error averager is described. Successive digital sets of phase error indications received from AND 99 are supplied to adder 110 which can accumulate four phase error readings and provide a sum of the four phase error readings over cable 111. The transition indicating signal received over line 100 is counted in counter 112 $K = 2^M$, where $M$ equals 2 for a four sample averager. When $K = 4$, counter 112 supplies an actuating signal over line 113 to cause adder 110 to read out the total sum of the four samples to divider 114, which is a scaling $2^{-M}$ shift register. The previous average value stored in shift register 114 is simultaneously read out through AND circuits 115, thence to scaler for making a clock phase correction. The above operation is repeated every four zero crossings for generating phase error corrections every fourth zero-azis zero-axis For example, if there is a zero-axis crossing at A, (FIG. 2) then zero-axis crossing E is the next time the clock is corrected in phase.

Figure 8:
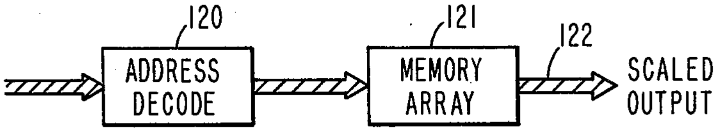
FIG. 8 is a block diagram of a digital signal processing circuit for scaling a set of digital signals being processed.

Referring to FIG. 8, scaler 116 consists of an address decode circuit 120 which converts the four-bit digital signal set from AND's 115 into one of 16 register selecting signals. The 16 lines carrying the one active register selecting signal selects one of the 16 registers in memory array 121 to provide a scaled output signal over cable 122. Memory array 121 consists of 16 JK flip-flop registers, each containing a four-bit digital signal set representing a value corresponding to the scaled value of the input to address decode 120. For example, if register 5 is accessed through decode 120, the input digit 5 would be scaled to digital output 3; i.e., the number 3 would be stored in register 5.

In addition to the above-described apparatus, the digital filter scaling shown in the IBM TECHNICAL DISCLOSURE BULLETIN, June 1973, Volume 16, Number 1, Pages 235 and 236, can be used with equal facility.

Figure 9:
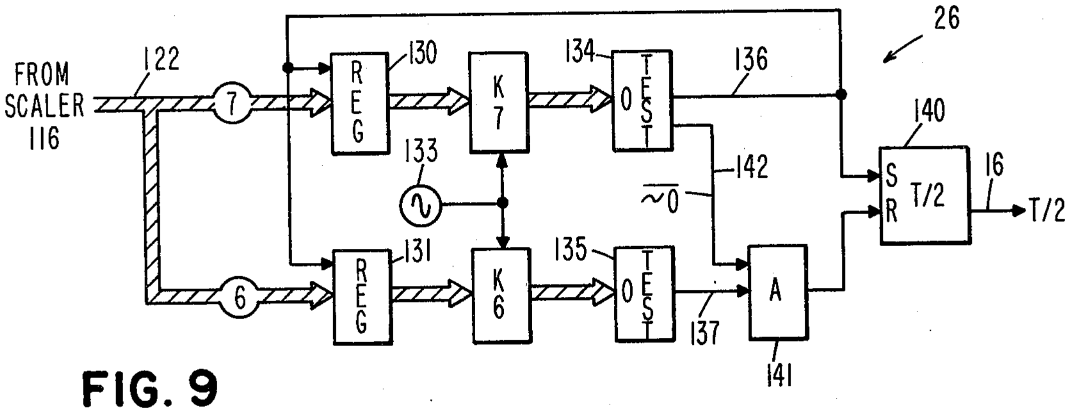
FIG. 9 is a signal flow diagram of a digital signal type of variable frequency oscillator usable with the FIG. 1 illustrated apparatus.

The numerically controlled oscillator (NCO) or digital VFO (variable frequency oscillator) is shown in FIG. 9. The eight-bit scaled quantity from scaler 116 on cable 122 has the seven information-significant bits (less sign) supplied to input buffer register 130 for controlling counter K7 to generate full-period signals, as will be described. These significant digits of the signals on cable 22 are supplied to register 131 for the half period generator driven by counter K6. A high-frequency oscillator 133 supplies pulses for counting K6 and K7 to zero. When zero is reached, a half period and a full period are, respectively, indicated. To this end, the zero test circuits 134 and 135 respond to the signal contents, respectively, of counters K7 and K6. When zero is reached, each of the zero test circuits supply a zero-indicating signal, respectively, over lines 136 and 137. The signal on line 136 signifying the end of a bit period gates the signals satisfied on cable 122, respectively, into registers 130 and 131. These registers have internal gating circuits (not shown) constructed using known techniques. The insertion of the seven-bit number in register 130 restarts the timing of a bit period.

The FIG. 9 illustrated apparatus generates the T/2 clock signal on line 16 in the following manner. Clock flip-flop 140 is set to the active condition by the line 136 pulse. Flip-flop 140, being in the set state, signifies that the first half of a bit period is occurring. The middle of the bit period, determined by the output of zero test circuit 135 signal on line 137, is gated to reset flip-flop 140 via AND circuit 141. The AND circuit is enabled to pass the half bit period signal any time zero test circuit 134 signifies that the count in K7 is not near zero. A signal on line 142 connected to the third and fourth digit positions of K7 via an OR circuit can be used to enable AND 141. The flip-flop 140 being reset signifies the second half of the bit period. Hence, the signal on line 16 is the T/2 clock shown in the FIG. 2 of waveforms.

Figure 10:
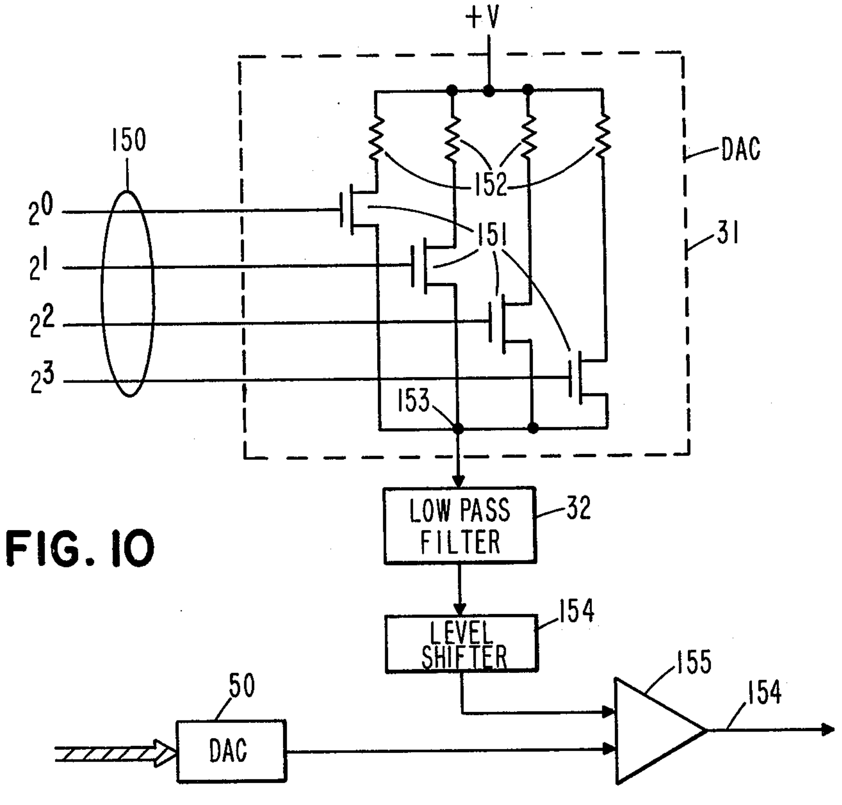
FIG. 10 is a signal flow diagram of digital signal feedback circuits for feeding back digital signal indicating magnitudes to an analog-to-digital converter.

Referring next to FIG. 10, an exemplary circuit is illustrated for accomplishing the feedback for providing automatic gain control in a digital readback system. The absolute quantity from digital rectifier 30 is supplied over cable 150 to DAC 31 to be converted into a current amplitude by a set of four FET transistors 151. One current electrode of the FET's 151 is respectively connected through a set of four binary weighted resistors 152. The other electrode of the FET's 151 is connected to a current summing node 153 which, in turn, is connected to low-pass filter 32 constructed using known analog signal techniques. The output of filter 32 is provided through a level shifter 154, such as an emitter follower, thence through differential amplifier 155 to supply the null checking output signal on line 154 to differential amplifier 44 (FIG. 3). DAC 50 supplies the other input to differential amplifier 155 such that the bias signal from level shifter 154 is differentially compared with the DAC output for adjusting the gain of the reference comparison signal on line 154. DAC 50 can be constructed in the same manner that DAC 31 is constructed.

Figure 11:
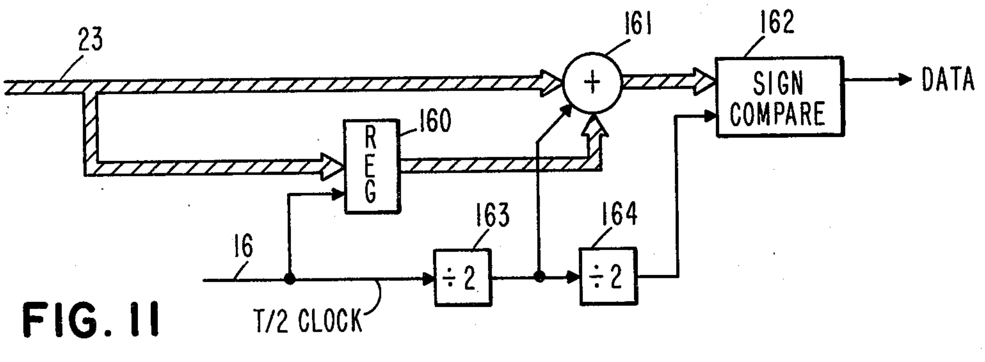
FIG. 11 is a simplified showing of a data detector usable with the FIG. 1 illustrated apparatus.

The FIG. 11 illustrated data detector sums the two digital signal samples from each bit period and then compares the signed summation from two successive bit periods to indicate absence or presence of a signal transition; i.e., data content of the readback signal. In each bit period, the first second signal set on cable 23 is stored in register 160. At the end of the bit period, adder 161 adds the sample signals in register 160 to the second sample to produce a set of bit period data indicating signals. Sign compare 162 compares the sign of two successive bit period signal sets to indicate a transition (change in sign) or no transition (no change in sign). Adder 161 and register 160 are reset (not shown) at the end of each bit period.

Operation is timed by the T/2 clock on line 16. Register 160 receives the first bit period sample at T/2. Divide by two circuit 163 activates adder 161 to add the cable 23 signals to the register 160 signals at the end of the bit period, clears register 160 and activates sign compare 162. In NRZI recording a change in sign signifies a binary 1 while no change in sign signifies a binary 0.

While the invention has been particularly shown and described with reference to preferred embodiments thereof, it will be understood by those skilled in the art that various changes in form and details may be made therein without departing from the spirit and scope of the invention.

What is claimed is:

1. A readback circuit for a digital signal recorder, sensing means for generating a readback signal having periodic bit periods T, the improvement including in combination:

sample and hold means receiving said readback signal and holding sampled signal amplitudes;

a digital-to-analog converter circuit (DAC) for repeatedly converting said held sampled signal amplitudes to first sets of digital signals, each set including a sign signal;

a gated DAC register receiving said first set of digital signals;

a first digital signal processing circuit receiving said first sets of digital signals and operative to generate second sets of digital signals, each including a sign signal, based upon said first sets of digital signals in accordance with a given transfer function;

timing means responsive to successive ones of said second sets of digital signals to adjust its operation to supply timing signals in accordance with said bit periods T;

said sample and hold means responsive to said timing signals to receive said readback signal at least at bit period boundaries;

said timing signals actuating said gated DAC register to receive said first sets of digital signals after each receipt of said readback signal amplitudes by said sample and hold means and further actuating said digital signal processing circuit to operate synchronously with said bit periods;

digital-to-analog converter means responsive to said second sets of digital signals to supply a bias signal related to a magnitude represented by successive ones of said second sets of digital signals; and means in said sample and hold means responsive to said bias signal to adjust said sampled signal amplitude in accordance therewith.

2. The readback circuit set forth in claim 1 wherein said digital signal processing circuit includes a first digital signal processing portion which is a bilinear Z transformation of an analog equalizing circuit and a second digital signal processing portion together effecting an equalizing and a DC restore function on said first sets of digital signals.

3. The readback circuit set forth in claim 1 further including a feedback digital signal processing circuit converting said second sets of digital signals to absolute magnitude sets, digital signal processing low pass filter means responsive to said feedback digital signal processing circuit to supply a readback signal envelope indicating set of digital signals, digital signal DC restore circuit in said first digital signal processing circuit receiving said signal envelope indicating set of digital signals and converting same to a second absolute magnitude set of digital signals, scaling means in said digital signal DC restore circuit for receiving said second absolute magnitude set of digital signals to produce a DC restore set of digital signals, and adder means in said digital signal DC restore circuit for combining said DC restore set of digital signals with corresponding sets of digital signals derived from said first set of digital signals to produce said second set of digital signals.

4. The readback circuit set forth in claim 3 wherein said signal sets have N-binary signals and said first digital signal processing circuit includes a digital signal equalizing circuit receiving said first sets of digital signals to generate said corresponding sets of digital signals wherein said digital signal equalizing circuit is a Z transformation of an analog equalizing circuit and comprising;

a first signal path means for processing said first sets of digital signals in accordance with a predetermined multiplicative function to produce N-bit partial equalized sets of digital signals, a plurality of second signal path means each for processing said first sets of digital signals each in accordance with multiplicative and summation of 2N bit intermediate signal sets and each said second path means having an output multiplicative means for performing a predetermined N-bit multiplicative function to produce additional N-bit partial equalized sets of digital signals, and N-bit adder means combining said N-bit partial equalized signal sets of digital signals into said corresponding sets of digital signals.

5. The readback circuit set forth in claim 4 further including digital data detector means receiving said second sets of digital signals and responsive to said timing signals to sense sign changes in said second sets of digital signals to indicate data in said readback signal.

6. A readback circuit for a magnetic record medium storing digital-like signals, means for sensing said stored signals and supplying an analog-type readback signal representative of said sensed stored signals, the improvement including in combination:

a sample and hold circuit receiving said readback signal and holding sampled amplitudes, an analog-to-digital converter for converting said held sampled amplitudes to a set of signed parallel digital signals, first digital signal processing circuit means receiving said parallel digital signals and processing same in accordance with a predetermined transfer function to produce a second set of signed digital signals, feedback means receiving said second set of digital signals including a digital-to-analog converter for supplying an analog feedback signal derived from said second set of digital signals, said sample and hold circuit including analog gain adjust means responsive to said analog feedback signal to adjust said received signal amplitudes in accordance therewith, and a timing signal generator responsive to said second set of digital signals to supply timing signals slaved to said readback signal for timing said sample and hold circuit to receive said readback signals at predetermined sample times and for timing said digital signal processing circuits.

7. The readback circuit set forth in claim 6 wherein said feedback means includes digital signal absolute magnitude means for converting each said set of second digital signals to an absolute magnitude set of digital signals, and said digital-to-analog converter receiving said absolute magnitude set of digital signals.

8. The readback circuit set forth in claim 7 wherein said first digital signal processing circuit means includes a portion responsive to signal envelope indicating sets of digital signals for altering the effect of said predetermined transfer function in accordance therewith, digital signal processing low pass filter means receiving said absolute magnitude set of digital signals for correcting same to said signal envelope indicating set of digital signals.

9. The method of extracting data from a periodic readback signal derived from a record medium, the steps of:

correcting said readback signal into successive sets of first signed digital signals representative of readback signal amplitude and polarity at predetermined signal points including adjacent zero-crossover points, processing said first signal sets in accordance with a predetermined transfer function to produce corresponding second signed sets of digital signals, combining successive ones of said second signed sets of digital signals to produce timing pulses related to said periodic readback signal, timing said converting and processing steps in accordance with said timing pulses, and indicating data in accordance with predetermined successive ones of said second sets in accordance with said timing pulses.

10. The method set forth in claim 9 having the steps of generating an analog indication of an absolute magnitude of given successive ones of said second sets of digital signals, and adjusting said converting step in accordance with said analog indication.

* * * * *